(12) United States Patent
Doerr et al.

(10) Patent No.: US 8,512,447 B2
(45) Date of Patent: Aug. 20, 2013

(54) METHOD FOR PURIFYING A CHLORINE SUPPLY

(75) Inventors: Robert A. Doerr, Baton Rouge, LA (US); Steven D. Gagnon, Prairieville, LA (US); Kenneth K. Bordelon, Geismar, LA (US); Johannes D. Jacobs, Ossendrecht (NL); Thomas A. Grzanka, Baton Rouge, LA (US)

(73) Assignee: BASF SE, Ludwigshafen (DE)

( * ) Notice: Subject to any disclaimer, the term of this patent is extended or adjusted under 35 U.S.C. 154(b) by 265 days.

(21) Appl. No.: 12/945,031

(22) Filed: Nov. 12, 2010

(65) Prior Publication Data

US 2011/0144381 A1 Jun. 16, 2011

Related U.S. Application Data

(60) Provisional application No. 61/261,176, filed on Nov. 13, 2009.

(51) Int. Cl.
*B01D 53/02* (2006.01)
*C01B 21/00* (2006.01)

(52) U.S. Cl.
USPC .......................... 95/182; 423/235; 423/240 R

(58) Field of Classification Search
USPC ................................ 95/182; 423/235, 240 R
See application file for complete search history.

(56) References Cited

U.S. PATENT DOCUMENTS

| 2,199,797 | A | 5/1940 | Hunter |
| 3,668,078 | A | 6/1972 | Holland |
| 3,702,234 | A | 11/1972 | Pavia |
| 4,003,982 | A | 1/1977 | Hill et al. |
| 4,032,619 | A | 6/1977 | Laran et al. |
| 4,764,286 | A | 8/1988 | Bon et al. |
| 4,963,341 | A | 10/1990 | Huxtable et al. |
| 5,437,711 | A | 8/1995 | Kaplin et al. |
| 6,900,348 | B1 | 5/2005 | Reif et al. |
| 2007/0180855 | A1 | 8/2007 | Butts |

FOREIGN PATENT DOCUMENTS

| DE | 102006008606 A1 | 7/2007 |
| EP | 1972609 A1 | 9/2008 |
| GB | 767792 | 2/1957 |
| GB | 900457 A | 7/1962 |
| WO | WO 9218235 A1 | 10/1992 |
| WO | WO 2004018355 A1 | 3/2004 |
| WO | WO2011058069 A2 | 5/2011 |

OTHER PUBLICATIONS

Jack F. Mills and John A. Schneider, "Bromine Chloride: an Alternative to Bromine," Ind. Eng. Chem. Prod. Res. Develop., vol. 12, No. 3, published in 1973, 6 pages.

(Continued)

*Primary Examiner* — Jafar Parsa
(74) *Attorney, Agent, or Firm* — Howard & Howard Attorneys PLLC

(57) ABSTRACT

This invention provides a method for purifying a chlorine supply that includes a chlorine component, a bromine component, and nitrogen trichloride. The method includes the steps of introducing the chlorine supply into a vaporizer, heating the chlorine supply in the vaporizer to form a vapor, and introducing the vapor into a distillation system to provide purified chlorine gas, a distillate that includes liquid chlorine and the bromine component, and a bottoms component including the nitrogen trichloride. The method also includes the steps of condensing the vapor in a reflux condenser, heating the condensate in a reboiler, removing the purified chlorine gas from the distillation system, and removing the distillate from the distillation system.

24 Claims, 6 Drawing Sheets

(56) References Cited

OTHER PUBLICATIONS

Jean-Louis Gustin, "Safety of chlorine production and chlorination processes," Division of Chemical Health and Safety of the American Chemical Society, published Jan./Feb. 2005, pp. 5-16.
The Chlorine Institute, Inc., "Safe Handling of Chlorine Containing Nitrogen Trichloride," Edition 1, Pamphlet 152, published Apr. 1998, 26 pages.
The American Society for Testing and Materials, "Standard Test Method for Bromine Chloride in Liquid Chlorine by High Performance Liquid Chromatography," Designation E 2037, published in 1999, 5 pages.
PCT International Search Report PCT/EP2010/067233, 6 pages, dated Jun. 30, 2011.
Ullman's Ecyclopedia of Idustrial Chemistry, "Hydraulic Fluids", vol. A 13, 1984, pp. 165-176.
G.E. Ross, "Performance Testing of Hydraulic Fluids", Chapter 35: Fire Resistant Hydraulic Fluids in High Pressure Diecasting Machines, 1979, pp. 533-542.
Ullman's Ecyclopedia of Idustrial Chemistry, "Lubricants and Related Products", vol. A 15, 1985, pp. 423-518.
R.M. Mortier et al., "Chemistry and Technology of Lubricants", Chapter 12: Extreme-Pressure and anti-wear additives, 1992, 16 pages.
R.M. Mortier et al., "Chemistry and Technology of Lubricants", Chapter 8.4: Hydraulic lubricants (fluids), 1992, 10 pages.
Henri Ulrich, "Isocyanates, Organic", Ullman's Encyclopedia of Industrial Chemistry, Jan. 1, 1989, vol. A 14, pp. 611-625.
Wolfgang Schneider et al., Ullman's Encyclopedia of Industrial Chemistry, "Phosgene", Jun. 15, 2000, vol. 26, pp. 71-80.
J.D. Seader et al., Perry's Chemical Engineers' Handbook, "Distillation", Mar. 1, 2001, section 13, pp. (13-1) to (13-108.).
V. V. Azatyan et al., "Kinetics of NCl3 Decomposition in an Attenuated Flame", Combustion, Explosion, and Shock Waves, vol. 14, No. 2, Match-Apr. 1978, 7 pages.
N. M. Rubtsov et al., "Determination of the Rate Constants of Chain Initiation and Propagation in the Decomposition of Nitrogen Trichloride", No. 6, Jun. 1980, pp. 860-864.
R. R. Borodulin et al., "Vibrationally Excited Particles in the Decomposition of Nitrogen Trichloride in the Gas Phase", Sov. J. Chem. Phys., vol. 4(2), 1986, pp. 347-354.
Z. I. Kaganova, "On the Second Limit of Propagation of an Isothermal NCl3 Decomposition Flame", Sov. J. Chem. Phys., vol. 3(2), 1985, pp. 450-454.
English language abstract for: V. G. Voronkov et al., "Spontaneous Ignition and Flame Propagation in Air Mixtures of Nitrogen Trichloride Vapor", vol. 28(6), 1978, pp. 75-76.
English language abstract for: E. N. Konaev et al., "Cold-Flame Combustion of Nitrogen Trichloride Vapor in an Inert Diluent", vol. 28(6), 1978, pp. 73-74.
English language abstract for: V. G. Voronkov et al., "Nonthermal Flame Propagation in Lean Mixtures of Nitrogen Trichloride Vapor in Helium", vol. 6, 1989, pp. 12-15.

METHOD FOR PURIFYING A CHLORINE SUPPLY

CROSS-REFERENCE TO RELATED APPLICATION

The subject patent application claims priority to, and all the benefits of, U.S. Provisional Patent Application Ser. No. 61/261,176 filed on Nov. 13, 2009. The entirety of this provisional patent application is expressly incorporated herein by reference.

FIELD OF THE INVENTION

The present invention generally relates to a method for purifying a chlorine supply including a chlorine component, a bromine component, and nitrogen trichloride. More specifically, the method includes utilizing a particular distillation system to form purified chlorine gas and to decompose the nitrogen trichloride.

DESCRIPTION OF THE RELATED ART

Chlorine gas is typically commercially produced using one or more well known electrolysis processes such as mercury cell electrolysis, diaphragm cell electrolysis, membrane cell electrolysis, and/or electrolysis of fused chloride salts according to the Downs Process. The electrolysis processes typically produce chlorine through electrochemical reactions in brine solutions (e.g. NaCl and KCl solutions) as follows:

Cathode: $2H^+(aq) + 2e^- \rightarrow H_2(g)$

Anode: $2Cl^-(aq) \rightarrow Cl_2(g) + 2e^-$

Overall process: $2NaCl(or\ KCl) + 2H_2O \rightarrow Cl_2(g) + H_2 + 2NaOH(or\ KOH)$ After formation, the chlorine gas can be treated with water and/or steam and then dried by cooling or treatment with sulfuric acid to minimize chlorine hydrate formation.

At various points during the formation of chlorine gas, nitrogen trichloride ($NCl_3$) is also typically formed. It is believed that $NCl_3$ forms from side reactions of chlorine atoms and anhydrous ammonia or ammonium salts (e.g. ammonium hydroxide, ammonium chloride, and ammonium sulfate) that are present at one or more points in the process. These side reactions typically occur as follows:

$NH_3 + 3Cl_2 \rightarrow NCl_3 + 3H^+ + 3Cl^-$ $NH_4^+ + 3Cl_2 \rightarrow NCl_3 + 4H^+ + 3Cl^-$ $NH_4^+ + Cl^- + 3HClO \rightarrow NCl_3 + H^+ + Cl^- + 3H_2O$ The formation of nitrogen trichloride typically occurs due to brine contamination, steam contamination, and/or water contamination. Any urea that is present in the brine, steam, or water can hydrolyze to form ammonium which can then be converted into nitrogen trichloride. Alternatively, salts used to form the brine can be contaminated with ammonium nitrate that can be converted into nitrogen trichloride. Sodium hydroxide that is typically used to form the brine can also be contaminated with ammonia depending on purification processes. In some cases, sulfuric acid used to dry the chlorine gas can be contaminated with ammonia. In still other cases, direct contact cooling water or steam can be treated with amines, ammonia based flocculants, or chloramines which can lead to formation of nitrogen trichloride. Even ground water can include ammonia compounds that can be converted into nitrogen trichloride.

As is well known in the art, nitrogen trichloride is sensitive to heat, light, sound, and shock and can quickly degrade at a rate sufficient to cause an explosion. Accordingly, nitrogen trichloride is preferably removed from chlorine gas but is typically done so in a complex, time consuming, and expensive manner. As set forth in FIG. 1, which represents the prior art, dried chlorine gas formed from electrolysis is typically washed with liquid chlorine in a washing column to minimize an amount of the nitrogen trichloride and cool the chlorine gas thereby increasing safety. In addition, the washing column also separates chlorinated organic compounds from the chlorine gas thereby increasing the purity of the chlorine gas. The washing column is typically connected to an external condenser and reboiler to increase the efficiency of the washing process, as also set forth in FIG. 1. In the washing column, the nitrogen trichloride and the various chlorinated organic compounds typically condense or dissolve in the liquid chlorine and may be recycled through the external condenser and reboiler, as described above. The reboiler is typically operated cold (0° C.-5° C.) or hot (45° C.-60° C.) and can act as a storage vessel for the nitrogen trichloride or as a point of decomposition. Carbon tetrachloride ($CCl_4$) is typically added to the washing column to extract the nitrogen trichloride and allow for its removal from the washing column and subsequent disposal. Upon addition of the carbon tetrachloride, the nitrogen trichloride is separated from the chlorine, which is vaporized in the reboiler and returned to the washing column. After the chlorine gas is washed and separated from the nitrogen trichloride and the various chlorinated organic compounds, the chlorine gas is typically compressed using liquid ring compression, reciprocating compression, or centrifugal compression, cooled using inter- and after-coolers, and then liquefied into liquid chlorine. The liquid chlorine then can be scrubbed and sold commercially. However, even after drying, washing, compression, cooling, and liquefaction, trace amounts of both the carbon tetrachloride and the nitrogen trichloride, in addition to trace amounts of scrubbing compounds, typically leach into the liquid chlorine and act as impurities when the liquid chlorine and/or chlorine gas is used in downstream commercial synthetic processes.

In addition to the nitrogen trichloride, commercial production of chlorine gas tends to produce a variety of byproducts including molecular bromine ($Br_2$), bromine-chloride (Br—Cl), and various organic compounds. These byproducts, in addition to the carbon tetrachloride and the nitrogen trichloride, are also impurities when the chlorine gas is used in commercial processes. As is known in the art, when chlorine gas is used to synthesize phosgene, which in turn is used to synthesize isocyanates, presence of the carbon tetrachloride, nitrogen trichloride, and brominated compounds typically add color to the isocyanates which makes the isocyanates less commercially desirable. Accordingly, these byproducts are typically removed using distillation and other separation techniques because chlorine gas is more volatile than many of the byproducts. However, entire chlorine streams are typically evaporated to achieve such distillations. One example of a distillation process is schematically set forth in FIG. 1, as first introduced above. In this distillation process, and in many similar processes, external condensers and reboilers are used and connected via long lengths of pipes to form effective distillation systems. However, use of these types of systems is very expensive, untimely, and complex. In addition, the long lengths of pipes used in these systems only increase a number of points at which the systems can fail, thus increasing safety risks and concerns. Furthermore, many of these systems also fail to effectively reduce amounts of nitrogen trichloride to sufficient levels.

Some distillation systems utilize high pressure steam heated reboilers which have a tendency to lead to film boiling, hot spots, and superheated chlorine gas, all of which are undesirable. Moreover, many distillation systems have a tendency to suffer from chlorine and nitrogen trichloride "holdup," i.e., accumulation of excess amounts of chlorine gas and nitrogen trichloride in the distillation systems, which leads to safety and environmental concerns.

Other distillation systems do not effectively control amounts of incoming chlorine in relation to the efficiency of distillation and separation of desired compounds. This lack of control tends to reduce efficiency of the distillation systems and does not allow for customization of distillation processes to maximize separation of desired compounds. In addition, this lack of control contributes to the holdup of the chlorine and nitrogen trichloride, thus further increasing safety concerns.

Accordingly, there remains an opportunity to develop a cost-effective and energy efficient method for removing by-products from a chlorine supply that can be used safely and with decreased environmental concerns.

SUMMARY OF THE INVENTION AND ADVANTAGES

The instant invention provides a method for purifying a chlorine supply. The chlorine supply includes a chlorine component, a bromine component, and nitrogen trichloride. The chlorine supply is purified in a distillation system to form purified chlorine gas having less than 20 parts by weight of the bromine component per one million parts by weight of the purified chlorine gas and to form a distillate comprising liquid chlorine and the bromine component. The distillation system is fluidly connected to a vaporizer and includes a distillation tower that has an upper end, a lower end, a vertical axis extending through the upper and lower ends, and a vapor-liquid contact device to provide a vapor-liquid interface between a vapor and a condensate. The distillation system also includes a reflux condenser disposed above the distillation tower and in fluid communication with the upper end of the distillation tower. The reflux condenser shares the vertical axis with the distillation tower. The distillation system also includes a reboiler disposed below the distillation tower and in fluid communication with the lower end of the distillation tower. The method includes the steps of introducing the chlorine supply into the vaporizer, heating the chlorine supply in the vaporizer to form the vapor, and introducing the vapor into the distillation system to provide purified chlorine gas, a distillate including the liquid chlorine and the bromine component, and a bottoms component comprising the nitrogen trichloride. The method also includes the step of condensing the vapor in the reflux condenser to form the condensate which flows from the reflux condenser into the upper end of the distillation tower such that the condensate interacts with the vapor at vapor-liquid contact device thereby forming the purified chlorine gas and the distillate. Furthermore, the method includes the steps of heating the condensate in the reboiler, removing the purified chlorine gas from the distillation system, and removing the distillate from the distillation system.

The method of this invention purifies the chlorine supply with increased energy efficiency, increased cost savings, and increased safety, thereby reducing environmental concerns. This method also efficiently separates chlorine gas from various by-products while simultaneously reducing holdup of the nitrogen trichloride, liquid chlorine and the bromine component. This method also increases safety and reduces environmental concerns associated with distillation tower design through reduced use of piping and external condensers and reboilers.

BRIEF DESCRIPTION OF THE SEVERAL VIEWS OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
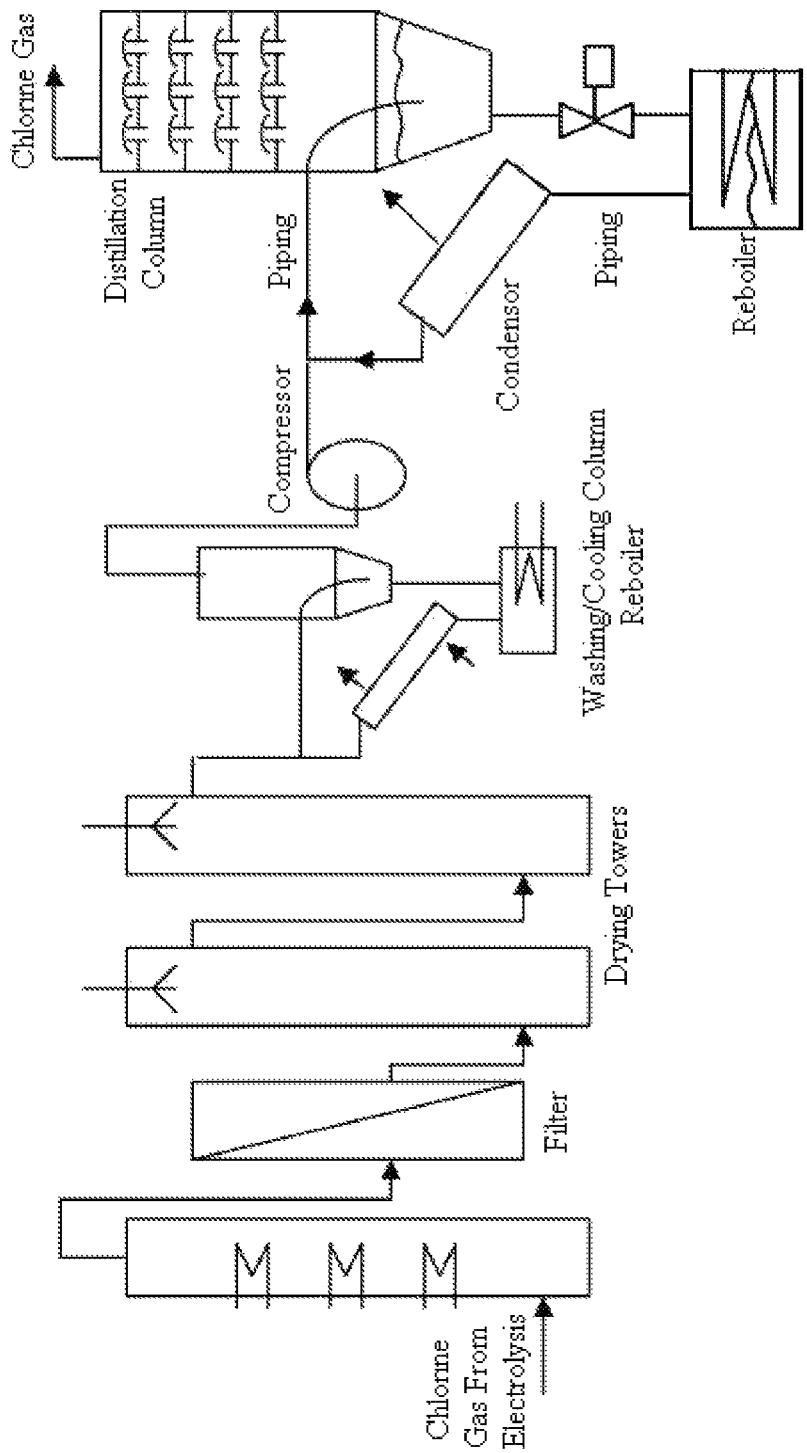
FIG. 1 is a schematic of a chlorine purification system of the prior art wherein chlorine gas is formed from electrolysis, filtered, dried, washed and then purified in a distillation system including a distillation tower and a condenser and reboiler that are disposed apart from the distillation tower.
Figure 2:
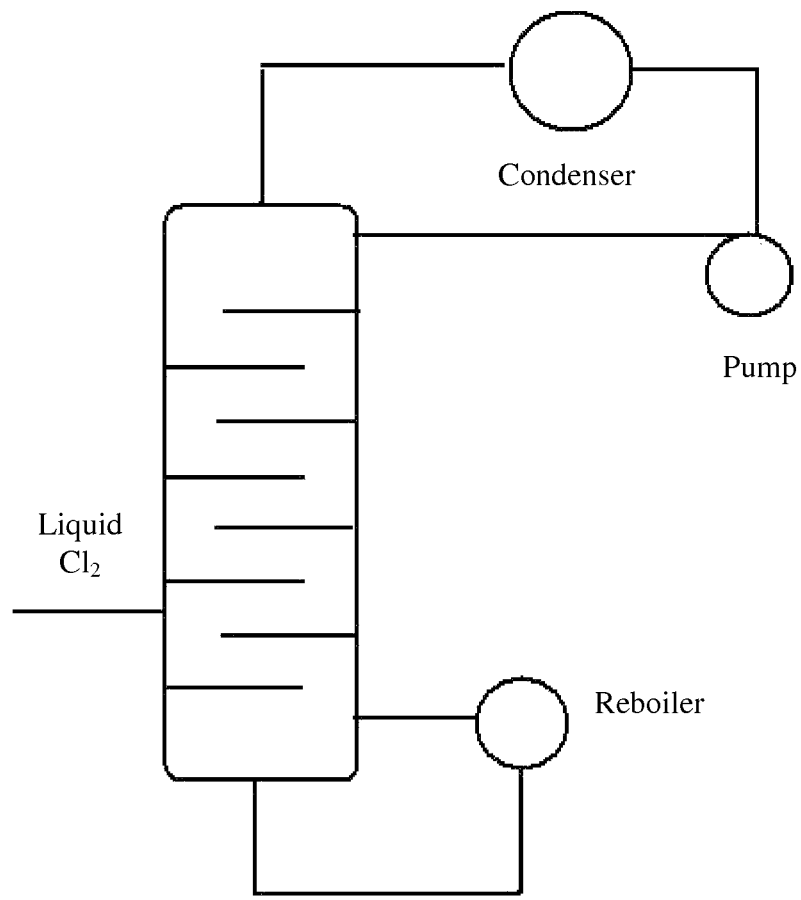
FIG. 2 is a schematic of a typical distillation tower of the prior art including a condenser, pump, and reboiler that are disposed apart from the distillation tower and long lengths of piping disposed therebetween.

The present invention provides a method for purifying a chlorine ($Cl_2$) supply and producing a purified chlorine gas (also known as an "overhead stream" in the art) in a distillation system (10). The purified chlorine gas is formed via distillation/fractionation procedures. The chlorine supply is not particularly limited and is not dependent on any particular method of formation. The chlorine supply may include liquid chlorine ($Cl_{2(l)}$) or gaseous chlorine ($Cl_{2(g)}$) such as those types used in commercial or industrial applications. The chlorine supply (also known as a "feed in" in the art) may be a finite supply or a continuous supply and may be provided from continuous or batch chlorine supply processes and/or in discrete units, such as from commercial tanker trunks or locomotive tanks. In one embodiment, the chlorine supply is provided in a semi-batch process. Typically, the chlorine supply is provided as a liquid via a pipeline to one or more storage locations and then purified and used. However, even when provided as a liquid, some chlorine gas tends to be present. The pipeline is typically supplied from railcars. Alternatively, the chlorine supply may be provided from as a gas or a mixture of a liquid and a gas.

The chlorine supply includes a chlorine component which may include, consist essentially of, or consist of liquid chlorine ($Cl_{2(l)}$) gaseous chlorine ($Cl_{2(g)}$), ferric chloride (iron (III) chloride), and/or chlorinated hydrocarbons such as carbon tetrachloride, chloroform, and methylene chloride. The terminology "consisting essentially of" limits the chlorine component, in one embodiment, from including an amount any other compound, such as organic compounds, that materially affects the basic and novel characteristics of the chlorine component. It is to be understood that trace amounts of these other compounds, such as trace amounts of the organic compounds, can be included so long as the trace amounts do not materially affects the basic and novel characteristics of the chlorine component. The chlorine supply also includes nitrogen trichloride ($NCl_3$). The nitrogen trichloride may be present as a liquid or a gas or as a mixture of a liquid and a gas.

Further, the chlorine supply also includes a bromine component which may include, consist essentially of, or consist of liquid bromine ($Br_{2(l)}$), gaseous bromine ($Br_{2(g)}$), bromine monochloride (Br—CL), and/or brominated hydrocarbons. The terminology "consisting essentially of" limits the bromine component, in one embodiment, from including any other compound, such as organic compounds, that materially affects the basic and novel characteristics of the bromine component. It is to be understood that trace amounts of these other compounds, such as trace amounts of the organic compounds, can be included so long as the trace amounts do not materially affects the basic and novel characteristics of the bromine component. In one embodiment, the bromine component includes liquid bromine ($Br_{2(l)}$), gaseous bromine ($Br_{2(g)}$), and bromine monochloride (Br—Cl).

The chlorine supply typically includes greater than 95, more typically greater than 97, still more typically greater than 99, even more typically greater than 99.5, and most typically at least 99.9, parts by weight of the chlorine component per 100 parts by weight of the chlorine supply. The chlorine supply also typically includes from 1 to 500, more typically of from 1 to 300, still more typically from 50-300, and even more typically from 50 to 200, parts by weight of the bromine component per one million parts by weight of the chlorine supply. In one embodiment, the chlorine supply includes approximately 200 parts by weight of the bromine component per one million parts by weight of the chlorine supply. The chlorine supply further typically includes less than about 5 and more typically of from 2 to 5, parts by weight of the nitrogen trichloride per one million parts by weight of the chlorine supply. The chlorine supply may also include water. In various embodiments, the water is present in an amount of less than about 30, and more typically in amounts of from 5 to 25, parts by weight per one million parts by weight of the chlorine supply.

In one embodiment, the chlorine supply includes the chlorine component, the bromine component, and the nitrogen trichloride. In another embodiment, the chlorine supply includes the chlorine component, the bromine component, the nitrogen trichloride, and the water. In still another embodiment, the chlorine supply consists essentially of the chlorine component, the bromine component, and the nitrogen trichloride. In yet another embodiment, the chlorine supply consists essentially of the chlorine component, the bromine component, the nitrogen trichloride, and the water. In these embodiments, the terminology "consisting essentially of" limits the chlorine supply from including any other compound, such as organic compounds, that materially affects the basic and novel characteristics of the chlorine component, the bromine component, the nitrogen trichloride, and/or the water. It is to be understood that trace amounts of these other compounds, such as trace amounts of the organic compounds, can be included so long as the trace amounts do not materially affects the basic and novel characteristics of the chlorine component, the bromine component, the nitrogen trichloride, and/or the water. In a further embodiment, the chlorine supply consists of the chlorine component, the bromine component, and the nitrogen trichloride. In still another embodiment, the chlorine supply consists of the chlorine component, the bromine component, the nitrogen trichloride, and the water.

In addition to the chlorine component, the bromine component, the nitrogen trichloride, and/or the water, the chlorine supply may also include carbon tetrachloride ($CCl_4$), as described above. In various embodiments, the chlorine supply typically includes less than about 20, more typically less than about 15, and most typically of about 10, parts by weight of the carbon tetrachloride per one million parts by weight of the chlorine supply.

Although the chlorine supply may include chlorine component, the bromine component, the nitrogen trichloride, the water, and/or carbon tetrachloride ($CCl_4$), the purified chlorine gas formed in the method of this invention typically includes less than 20, more typically less than 15, still more typically less than 10, and even more typically less than 5, parts by weight of the bromine component per one millions parts by weight of the purified chlorine gas. It is also contemplated that the purified chlorine gas may include about 4, 3, 2, or 1, part by weight of the bromine component per one millions parts by weight of the purified chlorine gas.

The method for purifying the chlorine supply includes the steps of introducing the chlorine supply into a vaporizer (12) and heating the chlorine supply in the vaporizer (12) to form a vapor. Typically, the chlorine supply is pumped from a storage unit at a temperature of from 0° C. to 20° C., from 5° C. to 20° C., from 5° C. to 15° C., or at about 10° C., into the vaporizer (12). The chlorine supply is also typically pumped at a pressure of from 1 to 20, from 5 to 15, from 10 to 15, or from about 12 to about 14, bar, into the vaporizer (12). The chlorine supply is typically introduced into the vaporizer (12) as a liquid but may be introduced into the vaporizer (12) as a mixture of a liquid and a gas.

The vaporizer (12) may be any known in the art and typically operates via thermal conduction, convection, or thermal radiation. Typically, the vaporizer (12) heats the chlorine supply beyond its boiling point to form the (chlorine) vapor. Most typically, the vaporizer (12) heats the chlorine supply to a temperature of from 50° C. to 120° C., even more typically of from 70° C. to 110° C., and still more typically of from 90° C. to 100° C., and most typically of from 95° C. to 100° C. In one embodiment, the vaporizer (12) heats the chlorine supply to a temperature of about 92° C. to 98° C. The step of heating the chlorine supply may be further defined as vaporizing and super-heating the chlorine supply to facilitate decomposition of nitrogen trichloride. Without intending to be bound by any particular theory, it is believed that at temperatures above 121° C., carbon steel experiences a rapid increase in corrosion, as is well known in the European Chlorine Industry ("Euro Chlor") and the Chlorine Institute. Typically, the vaporizer (12) forms the vapor at a pressure of 5 to 20, from 10 to 20, or from 10 to 15, bar. In one embodiment, the vaporizer (12) forms the vapor at a pressure of from about 10 to 14 bar.

In another embodiment, flow of the chlorine supply into the vaporizer (12) is controlled by pressure. Liquid chlorine may be vaporized at 12.5 bar gage and superheated to 95° C. through use of steam at 1 to 12, 1 to 5, or 1 to 2 bar. Most preferably, the steam is pressurized to 1.2 bar such that that liquid chlorine, and chlorine vapor, do not reach a temperature above 120° C. It is believe that at temperatures above 120° C., chlorine-iron reactivity increases substantially. Typically, the steam is automatically throttled to achieve a chlorine superheat temperature of from about 85° C. to 105° C. In one embodiment, an operating pressure of from about 10 to 14 bar is required to ensure adequate performance of a distillation tower (14).

The method also includes introducing the vapor into the distillation system (10) that is fluidly connected to the vaporizer (12). The vapor is typically introduced into the distillation system (10) at a pressure of from 5 to 20, from 10 to 20, or from 10 to 15, bar. In one embodiment, the vapor is introduced into the distillation system (10) at a pressure of from about 10 to 14 bar. The vapor is typically introduced into the distillation tower (14) through a vapor input (not shown in the Figures). The vapor input may be any type of valve, regulator, nozzle, spout, faucet, or the like. The vapor input typically fluidly connects the distillation tower (14) and the vaporizer (12) through a vapor line, pipe, or tube. The vapor input can be controlled with a flow controlling device that is described in greater detail below.

Typically, the step of introducing the vapor into the distillation system (10) produces liquid chlorine and purified chlorine gas in the distillation system (10). The step of introducing the vapor into the distillation system (10) also typically produces an overhead vapor including up to about 5 ppmw of the bromine component and a bottoms product of the chlorine component including up to about 15 wt % of the bromine component. The distillation system (10) may be any known in the art suitable for distillation and/or fractionation purposes. Typically, the distillation system (10) includes the distillation tower (14), first described above, which is also known in the art as a fractionation tower. The distillation system (10) also includes a reflux condenser (24) and a reboiler (26), which are described in greater detail below. The distillation system (10) may also include the flow controlling device. The distillation tower (14) may have one or more than one valve, control device, regulator, nozzle, spout, faucet, or the like, different from the vapor input, for adding or removing any component from the distillation tower (14) as desired by one of skill in the art.

Figure 4:
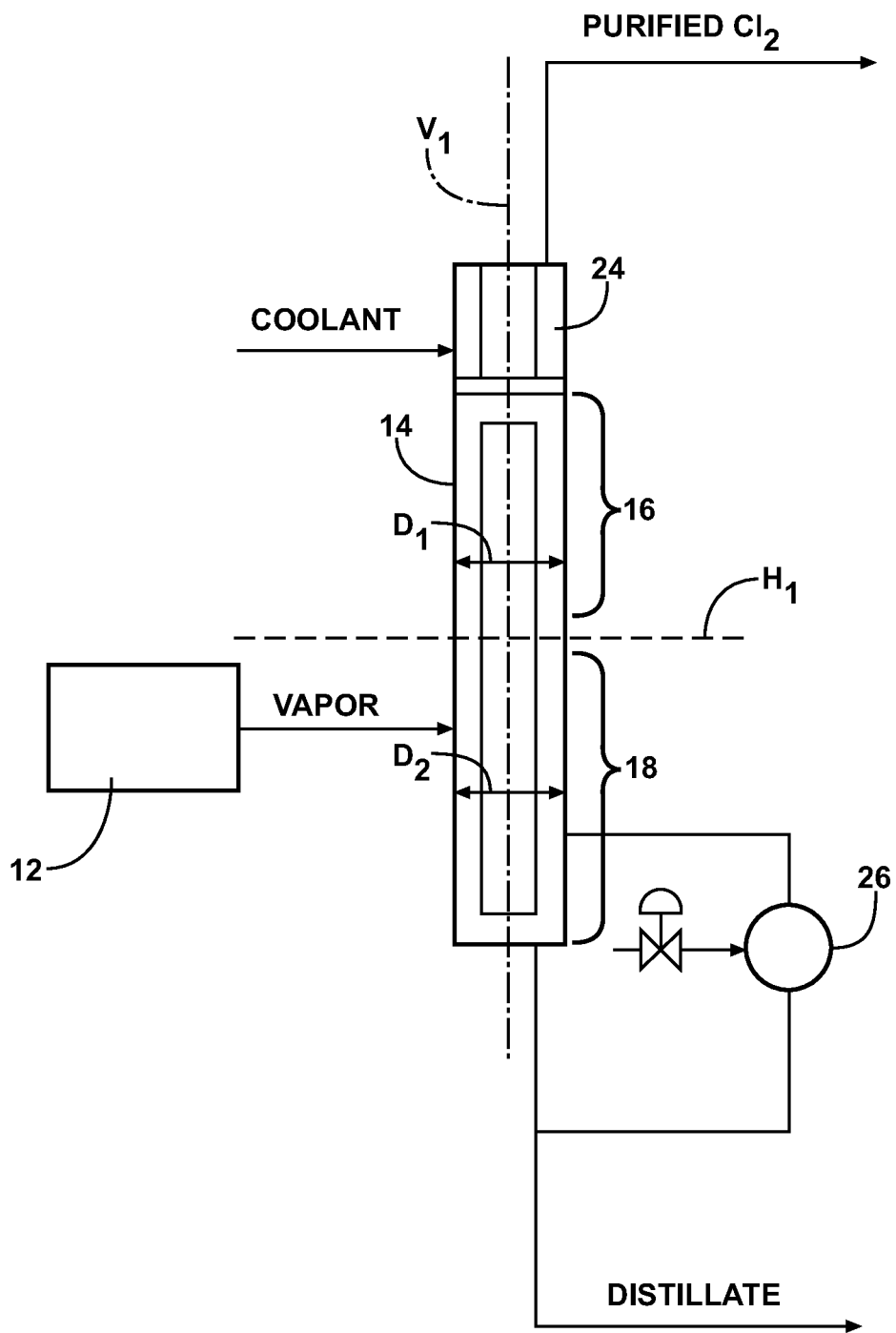
FIG. 4 is a schematic of one embodiment of the instant invention showing a distillation system including a distillation tower, a reflux condenser disposed above the distillation tower, in fluid communication with an upper end of the distillation tower, and sharing a vertical axis with the distillation tower to condense a vapor into a condensate such that the condensate flows into the upper end of the distillation tower, and a reboiler disposed below the distillation tower and in fluid communication with the lower end of the distillation tower to heat the condensate.
Figure 5:
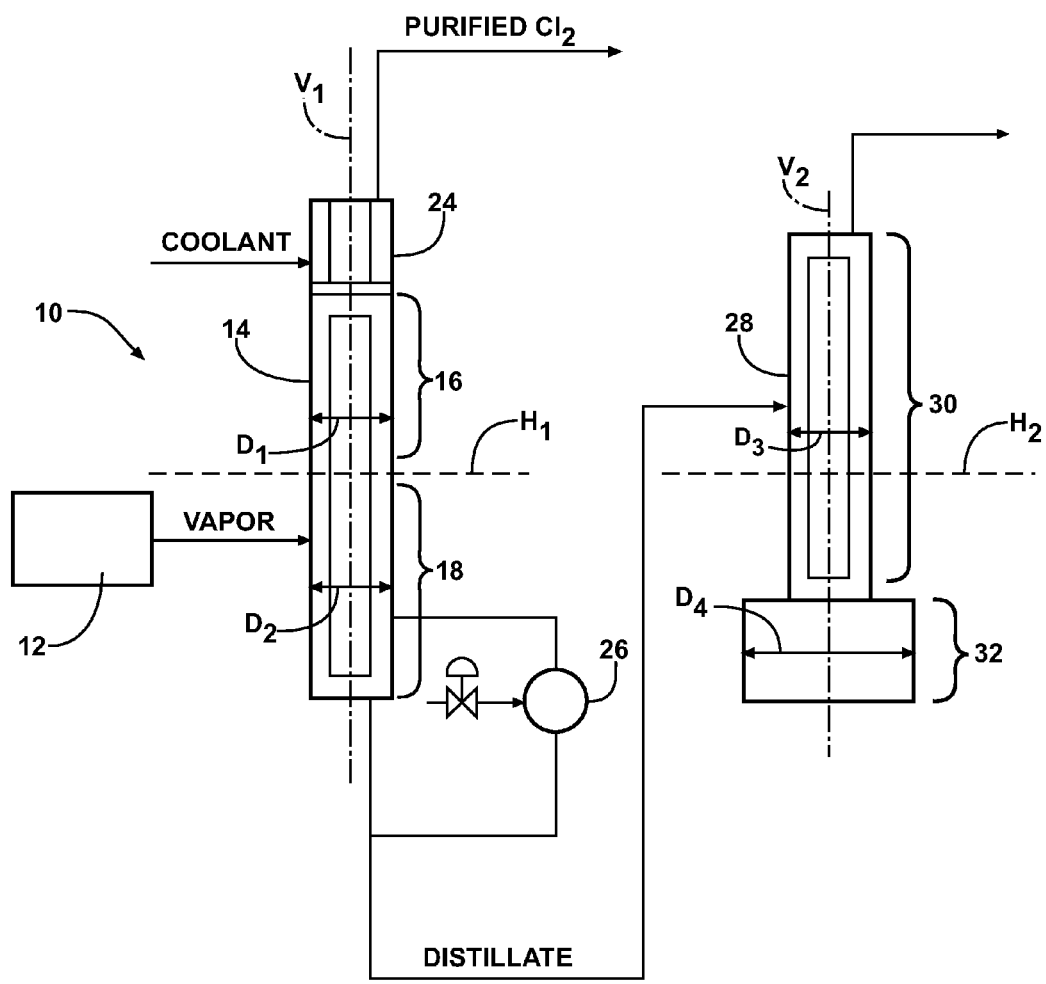
FIG. 5 is a schematic of another embodiment of the instant invention showing the distillation system of FIG. 4 in fluid communication with a neutralization tower.

The distillation tower (14) may be of any size and shape and may be designed using the McCabe-Thiele method, the Fenske equation, or various simulation models, as are well known in the art. Typically, the distillation tower (14) has a shape as set forth in FIG. 3, but is not limited to this shape. The distillation tower (14) is typically a column having an upper end (16) and a lower end (18). The upper end (16) and lower end (18) typically have varying widths, e.g. diameters ($D_1$, $D_2$, respectively). In other words, the distillation tower (14) typically has varying widths at different points along the tower, as shown in FIGS. 3-5.

In various embodiments, a ratio of a width of the upper end (16) to a width of the lower end (18) is about 1:1, 2:1, 3:1, 4:1, 5:1, 6:1, 7:1, or 8:1. It is also contemplated that these ratios may vary ±60%, ±50%, ±40%, ±30%, ±25%, ±20%, ±10%, ±5%. It is also contemplated that any range therebetween one or more of the aforementioned values may also be utilized. The distillation tower (14) typically has a height of from 4 to 30 meters (13 to 98 feet). In various embodiments, the distillation tower (14) has a height of from 9 to 21 meters (30 to 70 feet), more typically of from 9 to 18 meters (30 to 60 feet), and most typically of from 12 to 15 meters (40 to 50 feet). In one embodiment, the upper end (16) has a diameter of greater than or equal to 0.5 meters and the lower end (18) has a diameter less than 0.5 meters. In various embodiments, the distillation tower (14) has a width and/or height ±60%, ±50%, ±40%, ±30%, ±25%, ±20%, ±10%, ±5%, or any range therebetween, of the aforementioned values. Typically, the diameter and height of the distillation tower (14) vary depending on a variety of factors including, but not limited to, volatility differences in components, amounts/rates of bromine and chlorine to be separated, a purity of the incoming chlorine supply, operating temperatures, energy requirements, desired separation levels, and the like. Also, the height of the distillation tower (14) typically varies depending on a number of theoretical plates needed and a quality of distillation needed, as selected by one of skill in the art. Accordingly, one or more of these factors may be manipulated in the instant invention as determined by those of skill in the art. Typically, one or more of these factors is manipulated based on simulations derived from the McCabe-Thiele method and/or the Fenske equation which can be used to customize dimensions of the distillation tower (14).

Figure 3:
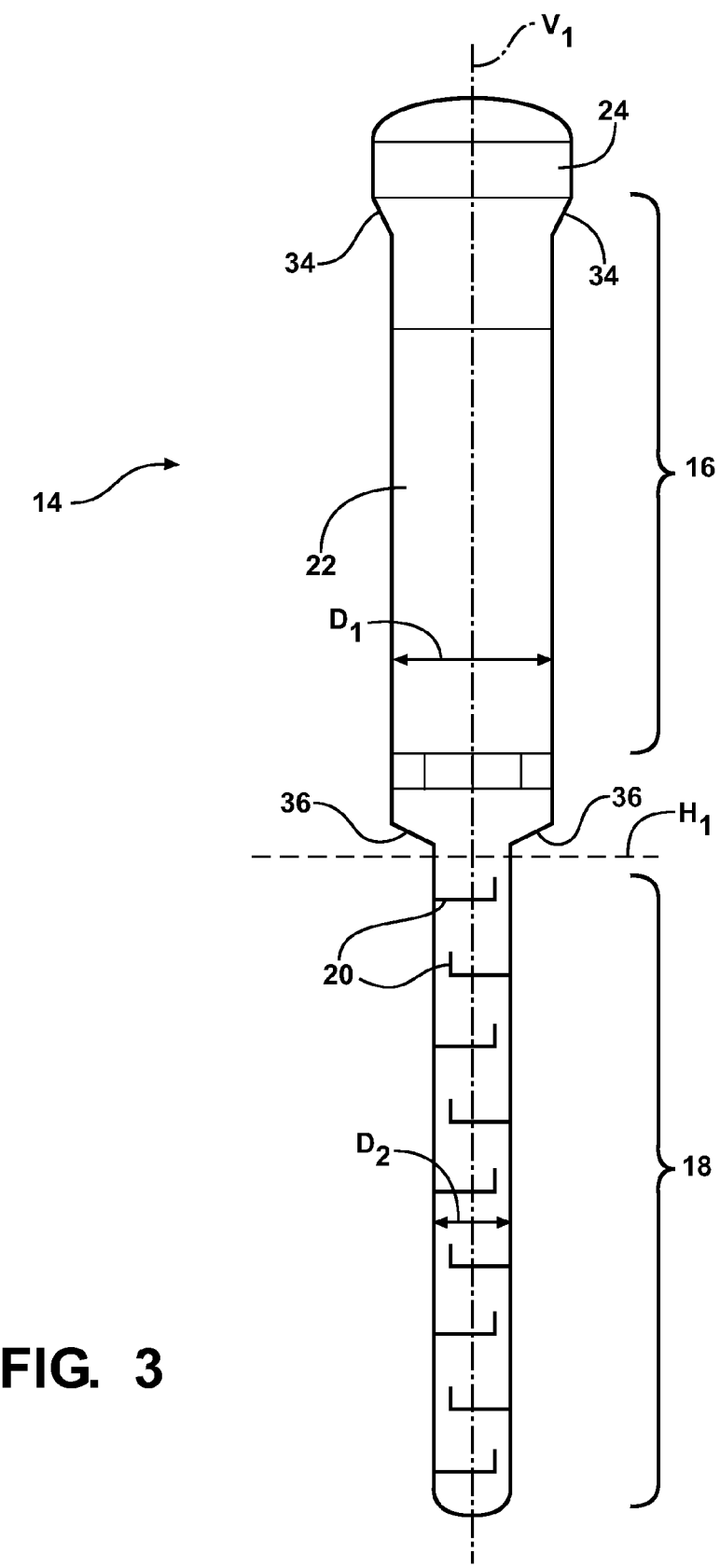
FIG. 3 is a side view of one embodiment of the distillation tower of the instant invention having an upper and a lower end wherein a width of the upper end is greater than a width of the lower end.

The distillation tower (14) has an upper end (16) and a lower end (18) and both are typically cylindrical, as shown in FIG. 3. The upper and lower ends (16, 18) may be right circular cylinders, elliptical cylinders, parabolic cylinders, or hyperbolic cylinders. The upper and lower ends (16, 18) may have the same shape or different shapes and neither must be cylindrical. Said differently, the upper and lower ends (16, 18) can be of any shape. Typically the upper end (16) is a right circular cylinder that has a greater diameter than the lower end (18) that is also typically a right circular cylinder, as shown in FIG. 3.

The upper end (16) is disposed above the lower end (18) relative to gravity and the earth. The distillation tower (14) typically has a vertical axis ($V_1$) that extends through the upper and lower ends (16, 18), as shown in FIG. 3. Typically, the upper and lower ends (16, 18) extend along the vertical axis ($V_1$). In one embodiment, the distillation tower (14) has two pairs of shoulders that extend radially from the vertical axis. A first pair of shoulders (34) is typically near the upper end (16) and forms an acute angle with the vertical axis. A second pair of shoulders (36) is typically disposed at the lower end (18) and forms an obtuse angle with the vertical axis ($V_1$). The distillation tower (14) also typically has a horizontal axis ($H_1$) that extends between the upper and lower ends (18), as also shown in FIG. 3. Additionally, the upper end (16) of the distillation tower (14) typically defines a first orifice (not shown) for removing the purified chlorine gas while the lower end (18) of the distillation tower (14) typically defines a second orifice (not shown) for removing other components produced from this method, as described in greater detail below.

The distillation tower (14) also typically includes at least one vapor-liquid contact device. In one embodiment, the at least one vapor-liquid contact device is disposed substantially transverse to the vertical axis ($V_1$) and substantially parallel to the horizontal axis ($H_1$). The at least one vapor-liquid contact device provides a vapor-liquid interface between the vapor rising up the distillation tower (14) and a condensate flowing down the distillation tower (14) from the reflux condenser (24). It is contemplated that the condensate may include purified chlorine and portions of a distillate, described in greater detail below. The condensate and the reflux condenser (24) are described in greater detail below. At the vapor-liquid interface, a vapor-liquid equilibrium exists such that the condensate purifies the vapor by absorbing impurities. Without intending to be bound by any particular theory, it is believed that the vapor-liquid interface in the distillation tower (14) allows liquid chlorine to "scrub" chlorine vapor. More specifically, the liquid chlorine interacts with the vapor rising from the reboiler (26). Interaction of the vapor and the condensate is believed to form the purified chlorine gas through both rectification and separation. In other words, the condensate provides necessary cooling to condense the vapor rising from the reboiler (26), thereby increasing the effectiveness of the distillation tower (14). Increased interaction of the condensate and the vapor increases the effectiveness of the distillation tower (14) and the formation of the purified chlorine gas. In addition to forming the purified chlorine gas, the condensate typically interacts with the vapor at the vapor-liquid contact device to form the distillate (also known as a "feed out" in the art). Both the purified chlorine gas and the distillate can be removed from the distillation tower (14).

The vapor-liquid contact device may be any known in the art and typically includes a plurality of trays (20) and/or packing material (22), as is well known in the art. In one embodiment, the distillation tower (14) includes a first vapor-liquid contact device within the upper end (16) and a second vapor-liquid contact device within the lower end (18). In this embodiment, the first vapor-liquid contact device is typically further defined as a body of packing material (22) while the second vapor-liquid contact device is typically further defined as a plurality of trays (20), as shown in FIG. 3.

Typically, the vapor condenses on the plurality of trays (20) and/or packing material (22) and runs down the distillation tower (14). The tray (20) that has the highest temperature is typically disposed in the distillation tower (14) in a lowermost position relative to the ground. The tray (20) with the lowest temperature is typically disposed in an uppermost position relative to the ground. As is well known in the art, at steady state conditions, vapor and liquid on each tray (20) are at thermal equilibrium.

The plurality of trays (20) may include any number of trays (20), as determined by one of skill in the art. However, the plurality of trays (20) typically includes from 3 to 30, from 5 to 25, from 5 to 20, from 5 to 15, or from 5 to 10, trays (20). It is also contemplated that any number of trays (20) within the aforementioned ranges may be utilized. Moreover, any type of tray (20) may be used in the instant invention, as selected by one of skill in the art. In one embodiment, the plurality of trays (20) is disposed substantially transverse to the vertical axis ($V_1$) and substantially parallel to the horizontal axis ($H_1$). In another embodiment, the plurality of trays (20) is further defined as horizontal trays (20).

Typically, each of the plurality of trays (20) has a diameter of from 0.25 to 0.76 meters (10 to 30 inches), from 0.25 to 0.50 meters (10 to 20 inches), or from 0.38 to 0.64 meters (15 to 25 inches). However, each of the plurality of trays (20) is not limited in size and shape. Moreover, each of the plurality of trays (20) is typically spaced from one another at a distance of from 0.25 to 0.76 meters (10 to 30 inches), from 0.25 to 0.50 meters (10 to 20 inches), or from 0.38 to 0.64 meters (15 to 25 inches). Again, this distance is not limited and may be varied by one of skill in the art. It is also contemplated that the diameter and spacing described above may vary ±60%, ±50%, ±40%, ±30%, ±25%, ±20%, ±10%, ±5%, or any range therebetween, of the aforementioned values.

The packing material (22) is typically utilized when low pressure drops across the distillation tower (14) are used, such as when a vacuum is employed. In one embodiment, the packing material (22) is used to the exclusion of the trays (20). In another embodiment, both packing material (22) and trays (20) are used. Typically, the packing material (22) is random dumped packing material (22) (e.g. 0.3-0.9 meters (1-3 feet) wide) such as Raschig rings or structured sheet metal. Liquids formed in the distillation tower (14), such as the condensate and the distillate, typically wet the packing material (22) while the vapor passes across the packing material (22), thus allowing mass transfer and purification of the vapor to take place. As is well known in the art, a vapor liquid equilibrium curve forms when using packing material (22) is continuous, as opposed to when a plurality of trays (20) is utilized wherein each tray (20) represents a separate point of vapor liquid equilibrium.

To maximize surface area per unit volume for an optimal liquid vapor interface, structured packing material (22) can be utilized in the upper portion of the distillation tower (14). As is known in the art, selection of ideal packing material (22) size involves a balancing between maximum efficiency and maximum capacity. In one embodiment of this invention, Flexipac 1YHC structure packing material (22) is utilized. Alternately a variety of random and/or dump packing material (22) may be utilized as well. The packing material (22) is not particularly limited in this invention and may include any known in the art. In one embodiment, the packing material (22) includes stainless steel, ceramic, nickel, chromium, manganese, iron, and/or chlorine stable polymers such as perfluorinated polymers (e.g. PTFE). In another embodiment, the packing material (22) is commercially available under the trade name Hastelloy.

Typically, the packing material (22) has a surface area to volume ratio of at least 50:1 and preferably higher. In various embodiments, the packing material (22) has a surface area to volume ratio of about 75:1, 100:1, 150:1, 200:1, 250:1, 300:1, 350:1, 400:1, 450:1, or 500:1. It is also contemplated that any ratio of surface area to volume within the aforementioned ratios may be utilized. The packing material (22) can be disposed within the distillation tower (14) in any amount. Typically, the amount of the packing material (22) disposed in the distillation tower (14) is optimized based on simulations derived from the McCabe-Thiele method and/or the Fenske equation. In various embodiments, the packing material (22) is disposed in the distillation tower (14) at a height of from 1.5 to 7.6 meters (5 to 25 feet), from 3 to 7.6 meters (10 to 25 feet), from 3 to 6 meters (10 to 20 feet), or from 3.6 to 4.9 meters (12 to 16 feet). It is also contemplated that the height described immediately above may vary ±60%, ±50%, ±40%, ±30%, ±25%, ±20%, ±10%, ±5%, or any range therebetween, of the aforementioned values.

The packing material (22) of this invention typically reduces the drag of the vapor on the condensate in the distillation tower allowing the condensate to move down the column to successively lower trays (20) without excessive accumulation. The packing material (22) typically reduces any liquid hold-up at the vapor-liquid interface and an open area for vapor flow is increased. The condensate and vapor typically flow in vertical countercurrent directions within the distillation tower (14) reducing a shear effect at a bottom edge of the packing material (22). This is thought to result in a significantly higher flooding capacity and a reduced pressure drop in a loading region of the packing material (22). In addition, a vertical region at the vapor-liquid interface tends to enlarge a turning radius for vapor flow and tends to reduce pressure drop associated with rotation between the plurality of trays (20). A smooth transition between the plurality of trays (20) enhances vapor handling capacity of the distillation tower (14). In one embodiment, increased column efficiency can be realized without a loss in capacity through use of packing material (22) with decreased crimp sizes with lower HETP and higher NTSM.

Referring now to the reflux condenser (24), this condenser is disposed above the distillation tower (14) and is typically flanged to the distillation tower (14). The reflux condenser (24) typically shares the vertical axis ($V_1$) of the distillation tower (14). The reflux condenser (24) may be disposed in direct contact with the distillation tower (14) or may be disposed apart from the distillation tower (14). In one embodiment, the reflux condenser (24) is disposed on, and in direct contact with, the first pair of shoulders (34) of the central body. The reflux condenser (24) typically has a height of from 0.3 to 3 meters (1 to 10 feet), of from 0.9 to 3 meters (3 to 10 feet), or from 1.8 to 3 meters (6 to 10 feet). The reflux condenser (24) also typically has a diameter equal to or slightly larger than the diameter of the upper end (16) of the distillation tower (14). In various embodiments, the reflux condenser (24) has a diameter of from 0.2 to 2.5 meters (10 to 100 inches), of from 0.5 to 2 meters (20 to 80 inches), or of from 0.6 to 1 meter (25 to 40 inches). In one embodiment, the reflux condenser (24) has a diameter of about 0.6 to 0.9 meters (25 to 35 inches). It is also contemplated that the height and diameters described above may vary ±60%, ±50%, ±40%, ±30%, ±25%, ±20%, ±10%, ±5%, or any range therebetween, of the aforementioned values.

The reflux condenser (24), first introduced above, is typically in fluid communication with the upper end (16) of the distillation tower (14) to condense the vapor and form the condensate, introduced above. Typically, the condensate flows (e.g. is distributed) into the upper end (16) of the distillation tower (14). The reflux condenser (24) is typically disposed in direct contact with the distillation tower (14) such that the condensate flows directly back into the upper end (16) of the distillation tower (14). This allows for minimized tubing and piping to be used, thereby increasing safety, efficiency, and cost-effectiveness.

The reflux condenser (24) is typically further defined as close-coupled and may be further defined as an integral overhead reflux condenser (24) or an overhead internal knockback condenser. The knockback condenser may be any known in the art and may be an upflow or a downflow knockback condenser. As is known in the art, knockback condensers typically utilize vapor risers to introduce a flow of the vapor into a headspace above a heat exchanger thereby establishing a flow of condensate. In the instant invention, the flow of condensate is typically distributed directly back into the upper end (16) of the distillation tower (14), as described above, while a portion is removed as the distillate, described in greater detail below. In one embodiment, the reflux condenser (24) is cooled using liquid coolant, which may be any known in the art. As is known in the art, portions of the vapor that are not refluxed as the condensate can be removed as the purified chlorine gas. The purified chlorine gas may be removed from the distillation system (10) at any temperature equal to or higher than the boiling point of chlorine under tower operating pressures.

Referring back to the reboiler (26) described above, the reboiler (26) is typically disposed below the distillation tower (14) and in fluid communication with the lower end (18) of the distillation tower (14). The reboiler (26) can be used to heat the condensate and decompose the nitrogen trichloride, but such step is not required in the instant invention. In one embodiment, the temperature of the reboiler (26) is below a temperature of decomposition of the nitrogen trichloride. As is well known in the art, reboilers (26) are heat exchangers and are typically used to provide heat to the bottom of the distillation tower (14). In one embodiment, the reboiler (26) provides heat to the distillation tower (14) such that the upper end (16) of the distillation tower (14) is maintained at a temperature of about 90° C. to 110° C. while the lower end (18) is maintained at a temperature of about 70° C. to 90° C. In another embodiment, the upper end (16) and the lower end (18) are maintained at temperatures that differ by about 1° C., 3° C., 5° C., 10° C., 15° C., 20° C., or 25° C. In other words, the reboiler (26) uses energy to drive the vapor up the distillation tower (14). Thus, the total amount of vapor in the distillation tower (14) is a function of the vapor entering from the vaporizer through the vapor input and the vapor formed from the reboiler (26). In one embodiment, the bottom of the distillation tower operates at a slightly higher temperature than the top due to an elevated content of high boiling point components and the use of superheated steam operating at saturation temperatures. In various embodiments, the reboiler (26) of this invention is coupled (e.g. electronically) with the reflux condenser (24) and the vapor input to control the amount of vapor entering the distillation tower (14). Typically, the reboiler (26) is a type of heat exchanger (e.g. schell and tube or plate and frame) that includes a heated fluid. The heated fluid is passed over or next to a liquid (such as the condensate) in the distillation tower (14) and exchanges energy or heat with the liquid without liquid/fluid contact.

The reboiler (26) of this invention typically vaporizes or boils the condensate and may simultaneously decompose the nitrogen trichloride while forming and heating the vapor in the distillation tower (14). However, the vapor can be heated in the distillation tower (14) by any means known in the art. The vapor may be heated via other means including through heating means disposed in contact with the distillation tower (14), other than the reboiler (26). In one embodiment, the vapor in the distillation system (10) is heated by additional chlorine vapor entering the distillation system (10).

In one embodiment, the heat of the reboiler (26) decomposes the nitrogen trichloride safely and in a manner that reduces a total amount of nitrogen trichloride present in the distillation system (10) at any one time. Without intending to be bound by any particular theory, it is believed that the nitrogen trichloride decomposes pursuant to the following equations such that inert nitrogen is formed and chlorine gas is formed that re-enters the distillation tower (14) and can be incorporated into the purified chlorine gas:

$$NCl_3 \rightarrow .NCl_2 + Cl. \text{(Initiation)}$$

$$Cl_2 \rightarrow 2Cl. \text{(Initiation)}$$

$$Cl. + NCl_3 \rightarrow .NCl_2 + Cl_2 \text{(Propagation)}$$

$$.NCl_2 + NCl_3 \rightarrow N_2 + 2Cl_2 + .Cl \text{(Propagation)}$$

The reboiler (26) may be any type known in the art and may operate via thermal conduction, convection, or thermal radiation. In one embodiment, the reboiler (26) is steam operated. In another embodiment, the reboiler (26) utilizes hot oil or a synthetic organic heat transfer fluid such as Dowtherm®, commercially available from the Dow Chemical Company. In still another embodiment, low pressure steam (e.g. steam at a pressure of from 1.2 to 10 bar) is used which minimizes the possibility that the condensate will reach a temperature in excess of 120° C. Typically, low pressure steam is recovered from a higher pressure steam condensate and then redistributed. Alternately, steam at a pressure of greater than 1.2 bar can be used in a cross exchanger. Typically, the reboiler (26) is further defined as a shell and tube heat exchanger. However, the instant invention is not limited to such a reboiler (26). It is contemplated that the reboiler (26) may be further defined as a kettle reboiler (26), a thermosyphon reboiler (26), a fired reboiler (26), or a forced circulation reboiler (26). In one embodiment, the reboiler (26) is heated with steam at 1 to 3 bar that is controlled or throttled to achieve a desired balance of components in the distillation tower (14).

In various embodiments, a specified amount of various boiling liquids is maintained in the reboiler (26). These liquids can require further purification or can be treated as waste. Typically, the level of liquids is maintained in reboiler (26) via a level control valve that manipulates the flow out of reboiler (26) to either an additional distillation system or an impurity destruction device.

In one alternative embodiment, the reflux condenser (24), the reboiler (26), and the vapor input are coupled to a flow controlling device (not shown in Figures) for controlling a rate of introducing the vapor into the distillation system (10), as first described above. The flow controlling device may be any known in the art. In one embodiment, the flow controlling device is a flow control valve which is automated and allows a rate of feed of the vapor to change with demand. The flow controlling device may be connected to a computer. In another embodiment, the flow controlling device is an orifice plate which is a flat piece of metal which defines an orifice. A size of the orifice determines feed rate depending on a differential pressure across the orifice plate. In still another embodiment, the flow controlling device is a manual block valve. When the flow controlling device is utilized, the method typically further comprises the step of controlling a rate of introducing the vapor into the distillation system (10) as a function of an amount of condensate distributed into the upper end (16) of the distillation tower (14) from the reflux condenser (24) and as a function of an amount of vapor formed from the reboiler (26).

The distillation system (10) may also include a neutralization tower (28) that is fluidly connected to the distillation tower (14). The distillate formed in the distillation tower (14) may be introduced into the neutralization tower (28) or may be used for other purposes, such as the formation of hydrogen chloride by using hydrogen in a "chlorine burner", formation of phosgene for processes wherein an elevated bromine level does not significantly impact quality of a final product, or direct chlorination of other processes wherein bromine does not significantly impact a final product quality or overall yield, without use of the neutralization tower (28).

Figure 6:
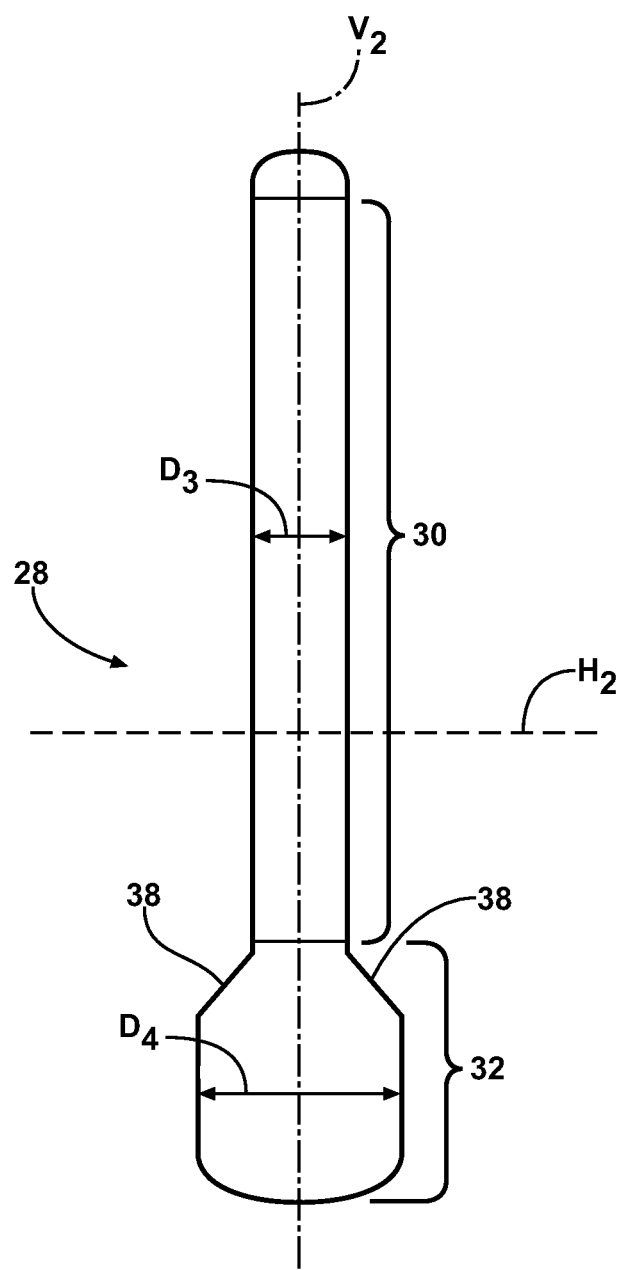
FIG. 6 is a side view of an embodiment of the neutralization tower having a first end and a second end wherein a width of the first end is greater than a width of the second end.

The neutralization tower (28) may be of any size and shape as is known in the art. Typically, the neutralization tower (28) has a shape as set forth in FIGS. 5 and 6, but is not limited to these shapes. The neutralization tower (28) is typically a column having a first end (30) and a second end (32). The first end (30) and a second end (32) typically have varying widths, e.g. diameters ($D_3$, $D_4$), as shown in FIGS. 5 and 6. In other words, the neutralization tower (28) typically has varying widths at different points. Typically, the varying widths or diameters ($D_3$, $D_4$) are of from 6 inches to 5 feet. The neutralization tower (28) typically has a height of from 1 meter to 100 meters. In one embodiment, the first end (30) is cylindrical and has a diameter of about 10 inches. In another embodiment, the second end (32) is also cylindrical and has a diameter of about 3 feet. In various embodiments, the neutralization tower (28) has a width and/or height ±60%, ±50%, ±40%, ±30%, ±25%, ±20%, ±10%, ±5%, or any range therebetween, of the aforementioned values.

The first end (30) of the neutralization tower (28) is disposed above the second end (32) relative to gravity and the earth. The neutralization tower (28) typically has a vertical axis ($V_2$) that extends through the first and second end (30, 32), as shown in FIGS. 5 and 6. Typically, the first and second ends (30, 32) extend along the vertical axis ($V_2$). In one embodiment, the neutralization tower (28) has a third pairs of shoulders (38) that extend radially from the vertical axis ($V_2$) and form an obtuse angle with the vertical axis ($V_2$). The neutralization tower (28) may also have a horizontal axis ($H_2$) that may or may not separate the first and second ends (30, 32).

The neutralization tower (28) may be the same as the distillation tower (14) or may be different. The neutralization tower (28) may have the same dimensions described above relative to the distillation tower (14) or may have different dimensions.

Typically, the neutralization tower (28) is used to neutralize the liquid chlorine and the bromine component, e.g. the molecular bromine and the bromine monochloride. In one embodiment, the neutralization tower (28) contains a reducing agent and a reducing catalyst. Typically, the reducing agent is selected from the group of metal hydroxides, metal sulfites, and combinations thereof. In one embodiment, the reducing agent is selected from the group of alkali metal hydroxides, alkaline earth metal hydroxides, and combinations thereof. In another embodiment, the reducing agent is selected from the group of alkali metal sulfites, alkaline earth metal sulfites, and combinations thereof. In yet another embodiment, the reducing agent is selected from the group of sodium hydroxide (NaOH), sodium bisulfite (NaHSO$_3$), and combinations thereof. The reducing catalyst may be any known in the art and is typically further defined as a metal reducing catalyst. Typical metal reducing catalysts include, but are not limited to, palladium, platinum, nickel, and combinations thereof. For descriptive purposes only, typical reduction reactions (and other side reactions) of the liquid chlorine, the molecular bromine, and the bromine monochloride are set forth below:

$$Br_2 + Cl_2 \leftrightarrow 2BrCl \quad (1)$$

$$Br_{2(l)} + 2NaOH_{(aq)} \rightarrow NaBr_{(aq)} + NaOBr_{(aq)} + H_2O_{(l)} \quad (2)$$

$$3BrO^-_{(aq)} \rightarrow 2Br^-_{(aq)} + BrO_3^-_{(aq)} \quad (3)$$

$$Cl_{2(aq)} + 2Br^-_{(aq)} \rightarrow 2Cl^-_{(aq)} + Br_{2(aq)} \quad (4)$$

$$Cl_{2(l)} + 2NaOH_{(aq)} \rightarrow NaCl_{(aq)} + NaOCl_{(aq)} + H_2O_{(l)} \quad (5)$$

$$3ClO^-_{(aq)} \rightarrow 2Cl^-_{(aq)} + ClO_3^-_{(aq)} \quad (6)$$

$$Br_{2(aq)} + 2Cl^-_{(aq)} \rightarrow 2Br^-_{aq} + Cl_{2(aq)} \quad (7)$$

$$NaOBr_{(aq)} + NaHSO_3 + NaOH \rightarrow Na_2SO_4 + NaBr + H_2O \quad (8)$$

$$NaOCl_{(aq)} + NaOH \rightarrow Na_2SO_4 + NaCl + H_2O \quad (9)$$

In one embodiment, the liquid chlorine and bromine components are converted to hypochlorites through treatment with caustic agents, such as those described above. Hypochlorites can be decomposed to form alkali halides and oxygen. Without intending to be bound by any particular theory, it is believed that the primary chemical reaction may be represented by the following equation:

$$2\, NaOCl \xrightarrow{\text{Catalyst}} 2\, NaCl + O_2$$

In one embodiment, chlorine gas is reacted with sodium hydroxide to form sodium chloride and sodium hypochlorite that can then be further treated, such as with the Hydecat process, described below. Typically, the catalyst used to treat the sodium hypochlorite and sodium chloride includes a metal oxide or hydroxides of cobalt, copper, iron magnesium, molybdenum, and/or nickel. These catalysts may be supported or unsupported. The catalyst used to convert the sodium hypochlorite to the sodium chloride is not particularly limited in this invention. Without intending to be bound by any particular theory, it is believed that time, temperature, pH and concentrations of catalyst and hypochlorite influence the reaction described above. Typically, below a pH of 7, hypochlorites readily decompose to release free chlorine.

In one embodiment, the instant invention utilizes a catalyst as described in U.S. Pat. No. 4,764,286, which is expressly incorporated herein by reference. In another embodiment, the instant invention utilizes a catalyst as described in U.S. Pat. No. 4,963,341, which is also expressly incorporated herein by reference. Moreover, the instant invention may also utilize the Hydecat® process as described in WO9218235, which is also expressly incorporated herein by reference.

The distillation system (10) may also include additional components, as are known in the art. For example, the distillation system (10) may include additional condensers, additional distillation tower (14), additional reboiler (26), and suitable valves, piping, and any other suitable components described in Perry's Chemical Engineer's Handbook, McGraw-Hill Professional; 8th edition (Oct. 23, 2007), which is expressly incorporated herein by reference relative to distillation and distillation systems (10) and components.

Referring back to the method, the method also includes the step of introducing the vapor into the distillation system (10) to provide the purified chlorine gas, the distillate including liquid chlorine and the bromine component, and a bottoms component including nitrogen trichloride. The method also includes the step of condensing the vapor in the reflux condenser (24) to form the condensate which flows from the reflux condenser (24) into the upper end (16) of the distillation tower (14) such that the condensate interacts with the vapor at the vapor-liquid contact device thereby forming the purified chlorine gas and the distillate. The method also includes the step of heating the condensate in the reboiler (26). This step may decompose the nitrogen trichloride in the bottoms component. Moreover, the method includes the step of removing the purified chlorine gas from the distillation system (10) and removing the distillate from the distillation system (10). As described above, the distillate may be removed from the distillation system (10) and introduced into the neutralization tower (28) or may be used for other purposes. In one embodiment, the vaporizer (12) adds heat into the distillation system (10) such that the size of the distillation tower (14) and/or reboiler (26) can be reduced. In this embodiment, the reboiler (26) uses less energy than otherwise would be required because the vaporizer (12) heats the chlorine to the appropriate temperature while the reboiler (26) maintains this temperature. In this embodiment, super-heated chlorine gas enters the distillation tower (14) from the vaporizer (12). Without intending to be bound by any particular theory, it is believed that this embodiment, and this invention, reduces energy consumption and increases safety.

As described above, the distillate typically includes liquid chlorine and the bromine component and a bottoms component including nitrogen trichloride. In one embodiment, the distillate includes $Br_2$ and $BrCl$. The distillate is typically heated in the reboiler (26) which may decompose the nitrogen trichloride. When the distillate is removed from the distillation tower (14), the bromine component is typically removed as well. The bromine component may be removed from the distillation system (10) at any temperature, as selected by one of skill in the art. In one embodiment, the distillation system (10) is in fluid communication with the neutralization tower (28), as described above, such that the bromine component is reduced and discarded. In another embodiment, the distillation system (10) is in fluid communication with a storage tank such that the bromine component may be used in various downstream applications.

The instant invention also provides a method of controlling a flow of a vapor from the vaporizer (12) to the distillation system (10). In this embodiment, the vapor is not particularly limited to a chlorine vapor, or the vapor described above, and may be any gaseous vapor. In this method, the reflux condenser (24), the reboiler (26), and the vapor input are typically electronically coupled with a flow controlling device. The method includes the steps of introducing the vapor into the distillation tower (14), condensing the vapor in the reflux condenser (24) to form the condensate, heating the condensate in the reboiler (26), and controlling a rate of introducing the vapor into the distillation tower (14) as a function of an amount of condensate flowing into the upper end (16) of the distillation tower (14) from the reflux condenser (24) and as a function of an amount of vapor formed from the reboiler (26) to minimize a buildup of the condensate in the distillation tower (14).

In one embodiment, the distillation system (10) is in fluid communication with a phosgene reactor such that the purified chlorine gas can be reacted with carbon monoxide to form phosgene gas ($Cl_2+CO \rightarrow COCl_2$).

The instant invention also provides a method of forming an isocyanate including the reaction product of an amine and phosgene, which may be produced as described immediately above. The isocyanate may include diisocyanates, polyisocyanates, biurets of isocyanates and polyisocyanates, isocyanurates of isocyanates and polyisocyanates, and combinations thereof. In one embodiment, the isocyanate is an n-functional isocyanate. In this embodiment, n is a number preferably from 2 to 5, more preferably from 2 to 4, and most preferably from 2 to 3. It is to be understood that n may be an integer or may have intermediate values from 2 to 5. Alternatively, the isocyanate may be selected from the group of aromatic isocyanates, aliphatic isocyanates, and combinations thereof. In another embodiment, the isocyanate is an aliphatic isocyanate such as hexamethylene diisocyanate or H12MDI. The isocyanate component may also be further defined as a modified multivalent aliphatic isocyanate, i.e., a product which is obtained through chemical reactions of aliphatic diisocyanates and/or aliphatic polyisocyanates. Examples include, but are not limited to, ureas, biurets, allophanates, carbodiimides, uretonimines, isocyanurates, urethane groups, dimers, trimers, and combinations thereof. In one embodiment, the isocyanate is further defined as an aromatic isocyanate. Typically, aromatic isocyanates correspond to the formula $R'(NCO)_z$ wherein R' is aromatic and z is an integer that corresponds to the valence of R'. Preferably, z is at least two. Suitable examples of aromatic isocyanates include, but are not limited to, tetramethylxylylene diisocyanate (TMXDI), 1,4-diisocyanatobenzene, 1,3-diisocyanato-o-xylene, 1,3-diisocyanato-p-xylene, 1,3-diisocyanato-m-xylene, 2,4-diisocyanato-1-chlorobenzene, 2,4-diisocyanato-1-nitro-benzene, 2,5-diisocyanato-1-nitrobenzene, m-phenylene diisocyanate, p-phenylene diisocyanate, 2,4-toluene diisocyanate, 2,6-toluene diisocyanate, mixtures of 2,4- and 2,6-toluene diisocyanate, 1,5-naphthalene diisocyanate, 1-methoxy-2,4-phenylene diisocyanate, 4,4'-diphenylmethane diisocyanate, 2,4'-diphenylmethane diisocyanate, 4,4'-biphenylene diisocyanate, 3,3'-dimethyl-4,4'-diphenylmethane diisocyanate, 3,3'-dimethyldiphenylmethane-4,4'-diisocyanate, triisocyanates such as 4,4',4"-triphenylmethane triisocyanate polymethylene polyphenylene polyisocyanate and 2,4, 6-toluene triisocyanate, tetraisocyanates such as 4,4'-dimethyl-2,2'-5,5'-diphenylmethane tetraisocyanate, toluene diisocyanate, 2,2'-diphenylmethane diisocyanate, 2,4'-diphenylmethane diisocyanate, 4,4'-diphenylmethane diisocyanate, polymethylene polyphenylene polyisocyanate, corresponding isomeric mixtures thereof, and combinations thereof. Alternatively, the aromatic isocyanate may include a triisocyanate product of m-TMXDI and 1,1,1-trimethylolpropane, a reaction product of toluene diisocyanate and 1,1,1-trimethylolpropane, and combinations thereof. In one embodiment, the isocyanate is selected from the group of methylene diphenyl diisocyanates, toluene diisocyanates, hexamethylene diisocyanates, H12MDIs, and combinations thereof.

The amine that reacts with the phosgene to form the isocyanate may be any known in the art. In one embodiment, the amine reacts with the phosgene to form an intermediate isocyanate which then further reacts to form one or more of the isocyanates described above. Typically, amines reacts with phosgene according to the following equation:

in the presence of a base such as pyridine.

The method of forming the isocyanate typically includes the steps of introducing the chlorine supply into the vaporizer (12), heating the chlorine supply in the vaporizer (12) to form the vapor, and introducing the vapor into the distillation tower (14) that is fluidly connected with the vaporizer (12). The chlorine supply, the vaporizer (12), the vapor, and the distillation tower (14) are typically as described above but are not limited to the above descriptions. This method typically includes the step of distilling the vapor in the distillation tower (14) to form the purified chlorine gas having less than 5 parts by weight of the bromine component per one million parts by weight of the purified chlorine gas. The method further typically includes the steps of heating the condensate and decomposing the nitrogen trichloride in the reboiler (26), removing the purified chlorine gas from the distillation tower (14), removing the distillate from the distillation tower (14), reacting the purified chlorine gas with carbon monoxide to form the phosgene, and reacting the phosgene with the amine to form the isocyanate. The steps of this method may be the same or different than those described above.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

What is claimed is:

1. A method for purifying a chlorine supply comprising a chlorine component, a bromine component, and nitrogen trichloride in a distillation system to form purified chlorine gas having less than 20 parts by weight of the bromine component per one million parts by weight of the purified chlorine gas and to form a distillate comprising liquid chlorine and the bromine component, wherein the distillation system is fluidly connected to a vaporizer and comprises a distillation tower that has an upper end and a lower end, a vertical axis extending through the upper and lower ends, and a vapor-liquid contact device to provide a vapor-liquid interface between a vapor and a condensate, a reflux condenser that is in fluid communication with the upper end of the distillation tower, disposed above the distillation tower, and that shares the vertical axis with the distillation tower, and wherein the distillation system also comprises a reboiler disposed below the distillation tower and in fluid communication with the lower end of the distillation tower, said method comprising the steps of:

A. introducing the chlorine supply into the vaporizer;
   B. heating the chlorine supply to a temperature of from 50° C. to 120° C. in the vaporizer to form the vapor;
   C. introducing the vapor into the distillation system to provide purified chlorine gas, a distillate comprising the liquid chlorine and the bromine component, and a bottoms component comprising the nitrogen trichloride;
   D. condensing the vapor in the reflux condenser to form the condensate which flows from the reflux condenser into the upper end of the distillation tower such that the condensate interacts with the vapor at vapor-liquid contact device thereby forming the purified chlorine gas and the distillate;
   E. heating the condensate in the reboiler;
   F. removing the purified chlorine gas from the distillation system; and
   G. removing the distillate from the distillation system.

2. A method as set forth in claim 1 wherein the chlorine supply further comprises water and carbon tetrachloride.

3. A method as set forth in claim 2 wherein the chlorine component comprises liquid molecular chlorine and gaseous molecular chlorine.

4. A method as set forth in claim 1 wherein the bromine component comprises molecular bromine and bromine monochloride.

5. A method as set forth in claim 1 wherein the chlorine supply consists essentially of the chlorine component, the bromine component, the nitrogen trichloride, water, and carbon tetrachloride, wherein the chlorine component comprises liquid molecular chlorine and gaseous molecular chlorine, and wherein the bromine component comprises molecular bromine and bromine monochloride.

6. A method as set forth in claim 1 wherein the reflux condenser is further defined as a knockback condenser.

7. A method as set forth in claim 1 wherein the upper end of the distillation tower defines a first orifice for removing the purified chlorine gas and the lower end of the distillation tower defines a second orifice for removing the distillate, wherein the step of removing the purified chlorine gas is further defined as removing the purified chlorine gas from the upper end of the distillation tower through the first orifice, and wherein the step of removing the distillate is further defined as removing the distillate from the lower end of the distillation tower through the second orifice.

8. A method as set forth in claim 7 further comprising the step of neutralizing the liquid chlorine and the bromine component.

9. A method as set forth in claim 8 wherein the step of neutralizing is further defined as reacting the liquid chlorine and the bromine component with a reducing agent in the presence of a reducing catalyst to form salts.

10. A method as set forth in claim 9 wherein the reducing agent is selected from the group of metal hydroxides, metal sulfites, and combinations thereof, and the reducing catalyst is a metal.

11. A method as set forth in claim 10 wherein the reducing agent comprises sodium hydroxide and sodium bisulfite.

12. A method as set forth in claim 1 wherein the step of removing the purified chlorine gas and the step of removing the distillate occur simultaneously.

13. A method as set forth in claim 1 wherein the vapor-liquid contact device is further defined as a plurality of horizontal trays.

14. A method as set forth in claim 1 wherein the vapor-liquid contact device is further defined as structured packing.

15. A method as set forth in claim 1 wherein the distillation tower is cylindrical and the upper end of the distillation tower has a diameter greater than a diameter of the lower end of the distillation tower to minimize an amount of the liquid chlorine and the nitrogen trichloride present in a bottom of the distillation tower.

16. A method as set forth in claim 15 wherein a ratio of the diameters of the upper and lower ends of the distillation tower is from 2:1 to 8:1.

17. A method as set forth in claim 1 wherein the step of heating the condensate in the reboiler is further defined as heating to a temperature of from 90° C. to 110° C.

18. A method as set forth in claim 1 wherein the reflux condenser, the reboiler, and a vapor input to the distillation tower are electronically coupled to a flow controlling device for controlling a rate of introducing the vapor into the distillation system and the method further comprises the step of controlling a rate of introducing the vapor into the distillation system through the vapor input as a function of an amount of condensate that flows from the reflux condenser into the upper end of the distillation tower and as a function of an amount of vapor formed from the reboiler.

19. A method of forming phosgene comprising the step of reacting carbon monoxide and purified chlorine gas obtained from the method set forth in claim 1.

20. A method of forming an isocyanate comprising the reaction product of an amine and the phosgene formed from the method set forth in claim 19.

21. A method for purifying a chlorine supply consisting essentially of a chlorine component comprising molecular chlorine, a bromine component comprising molecular bromine and bromine monochloride, nitrogen trichloride, water, and carbon tetrachloride, in a distillation system to form purified chlorine gas having less than 20 parts by weight of the bromine component per one million parts by weight of the purified chlorine gas and to form a distillate comprising liquid chlorine and the bromine component, wherein the distillation system is fluidly connected to a vaporizer and comprises a distillation tower that has an upper end, a lower end, a and vertical axis extending through the upper and lower ends, wherein the upper end has a diameter that is greater than a diameter of the lower end, and wherein the distillation tower comprises a plurality of horizontal trays to provide a vapor-liquid interface between a vapor and a condensate, a knockback condenser disposed above the distillation tower, in fluid communication with the upper end of the distillation tower, and sharing the vertical axis with the distillation tower, and a reboiler disposed below the distillation tower and in fluid communication with the lower end of the distillation tower, wherein the reflux condenser, the reboiler, and a vapor input to the distillation tower are electronically coupled to a flow controlling device for controlling a rate of introducing the vapor into the distillation system and the method further comprises the step of controlling a rate of introducing the vapor into the distillation system through the vapor input as a function of an amount of condensate that flows from the knockback condenser into the upper end of the distillation tower and as a function of an amount of vapor formed from the reboiler, said method comprising the steps of:

A. introducing the chlorine supply into the vaporizer;

B. heating the chlorine supply to a temperature of from 50° C. to 120° C. in the vaporizer to form the vapor;

C. introducing the vapor into the distillation system to provide purified chlorine gas, a distillate comprising the liquid chlorine and the bromine component, and a bottoms component comprising the nitrogen trichloride such that a rate of introducing the vapor into the distillation system is controlled as a function of an amount of condensate formed from the knockback condenser and as a function of an amount of vapor formed from the reboiler;

D. condensing the vapor in the reflux condenser to form the condensate which flows from the reflux condenser into the upper end of the distillation tower such that the condensate interacts with the vapor at vapor-liquid contact device thereby forming the purified chlorine gas and the distillate;

E. heating the condensate in the reboiler to a temperature of from 90° C. to 110° C.; and F. simultaneously removing the purified chlorine gas and the distillate from the distillation system.

22. A method as set forth in claim 21 further comprising the step of reacting the distillate and a reducing agent to form salts.

23. A method as set forth in claim 21 wherein the step of reacting the distillate and the reducing agent is further defined as reacting the distillate and the reducing agent in the present of a reducing catalyst and wherein the reducing agent is selected from the group of metal hydroxides, metal sulfites, and combinations thereof, and the reducing catalyst is a metal.

24. A method of forming phosgene comprising the step of reacting carbon monoxide and the purified chlorine gas obtained from the method set forth in claim 22.

\* \* \* \* \*